(12) United States Patent
Augustyn et al.

(10) Patent No.: US 8,259,952 B2
(45) Date of Patent: Sep. 4, 2012

(54) VEHICLE ENTERTAINMENT SYSTEM HAVING GROUND NOISE REDUCTION AND METHOD OF OPERATING THE SAME

(75) Inventors: Michael Thomas Augustyn, Kokomo, IN (US); Dennis L. Kinkead, Fishers, IN (US); B. Neal Rhodes, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 259 days.

(21) Appl. No.: 12/709,672

(22) Filed: Feb. 22, 2010

(65) Prior Publication Data
US 2011/0206208 A1 Aug. 25, 2011

(51) Int. Cl.
*H04R 5/00* (2006.01)
(52) U.S. Cl. .............................. 381/1; 381/86; 381/94.6
(58) Field of Classification Search .................. 381/1, 2, 381/123, 86, 17–19, 27, 120, 94.1–94.4, 381/71.1–71.6, 94.5, 94.6; 330/51, 148, 330/278, 69, 253, 124 R
See application file for complete search history.

(56) References Cited

U.S. PATENT DOCUMENTS

| | | | |
|---|---|---|---|
| 5,894,434 A * | 4/1999 | Tran | 365/156 |
| 6,133,787 A | 10/2000 | Yerkovich et al. | |
| 6,143,995 A | 11/2000 | Ward | |
| 7,466,828 B2 * | 12/2008 | Ito | 381/86 |
| 7,822,400 B1 * | 10/2010 | Son | 455/296 |
| 2008/0318641 A1 | 12/2008 | Lo et al. | |
| 2009/0117947 A1 * | 5/2009 | Birmingham | 455/569.2 |

* cited by examiner

*Primary Examiner* — Xu Mei
*Assistant Examiner* — Lao Lun-See
(74) *Attorney, Agent, or Firm* — Lawrence D. Hazelton

(57) ABSTRACT

A vehicle entertainment system and method that alternately configures an input of the entertainment system as a differential input that is decoupled from a ground point, or as ground referenced input that is coupled to a ground point. A noise detector determines a noise signal value for a ground switch module that alternately changes a switch state between a coupled state that couples the common connection to the ground point, and a decoupled state that decouples the common connection from the ground point, based upon the noise signal value being greater than a threshold.

9 Claims, 4 Drawing Sheets

VEHICLE ENTERTAINMENT SYSTEM HAVING GROUND NOISE REDUCTION AND METHOD OF OPERATING THE SAME

TECHNICAL FIELD OF INVENTION

The invention generally relates to vehicle entertainment system, and more particularly relates to a system and method for reducing ground noise received by the entertainment system.

BACKGROUND OF INVENTION

Vehicle manufacturers build and sell vehicles with entertainment systems to meet customer demands. It is known that a vehicle manufacturer may use the same model of core entertainment device on multiple vehicle models. Such core entertainment devices typically employ identical core functional blocks such as signal amplifiers, tone controls, and input selectors. The vehicle manufacturer may also variously add accessories such as CD players, DVD players, I-pod docks, and memory stick readers as signal sources in accordance with the desires of a vehicle customer purchasing the vehicle. In addition, entertainment systems typically have auxiliary input jacks so the vehicle customer can readily connect other signal sources. Each vehicle model may employ a different ground reference point for grounding the core entertainment device, and each signal source may have a distinct ground reference point that is different from the ground reference point used by the core entertainment device. The device connected to the auxiliary input jack may be connected to a ground reference in the vehicle through a 12V power adapter or cigarette lighter adapter, or may be powered by internal batteries and so has no connection to a ground reference. If the device connected to the auxiliary jack is connected to the 12V power adapter, the ground connection may be a direct low resistance connection, or may be a higher resistance isolated connection. Furthermore, the device connected to the auxiliary jack may require a voltage other than 12V so may include a linear type or switching type power converter. As such, the connection of a signal source to the core entertainment device may have an unknown grounding scheme and may be susceptible to ground noise corrupting the signal.

SUMMARY OF THE INVENTION

In accordance with one embodiment of this invention, a vehicle entertainment system having ground noise reduction that includes an input, a signal source, a ground point, a noise detector, and a ground switch module. The input has a left channel connection, a right channel connection, and a common connection characterized as a reference for the left channel connection and the right channel connection. The signal source has a left channel output coupled to the left channel connection, a right channel output coupled to the right channel connection, and a common return coupled to the common connection, wherein the common return is characterized as a reference for the left channel output and the right channel output. The ground point is at a location on the vehicle. The noise detector is configured to determine a noise signal value of a noise signal at the common connection. The ground switch module includes a switch configured to alternately change a switch state between a coupled state that couples the common connection to the ground point, and a decoupled state that decouples the common connection from the ground point. The ground switch module determines if the noise signal value is above a threshold and changes the switch state in response to the threshold being exceeded.

In another embodiment, a method of controlling a ground mode switch module in a vehicle entertainment system. The vehicle entertainment system has a common connection, a ground point at a location on the vehicle, a noise detector configured to determine a noise signal value, and a ground switch module configured to alternately change a switch state between a coupled state and a decoupled state. The method determines a noise signal value on the common connection, compares the noise signal value to a threshold, and changes the switch state if the noise signal exceeds a threshold.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
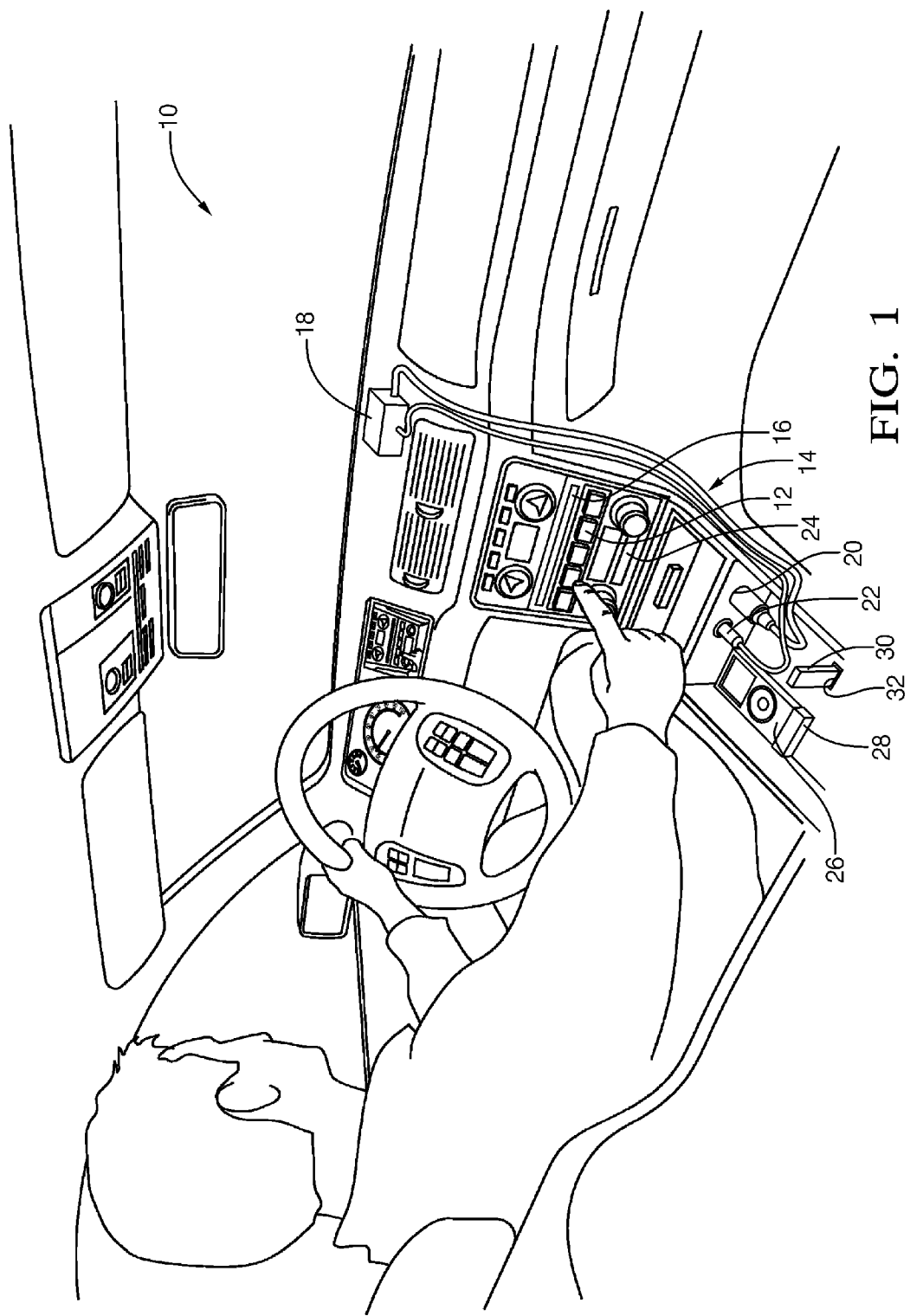
FIG. 1 is a cut-away view of an automobile interior having an vehicle entertainment system, according to one embodiment.

In accordance with an embodiment of a vehicle entertainment system 14, FIG. 1 illustrates an automobile interior 10 that includes an operator pressing an input selector switch 12 configured to select a signal source for input into the vehicle entertainment system 14. According to one embodiment, suitable signal sources may include a CD player 16, a satellite receiver 18 plugged into a 12 Volt power port 20 and an auxiliary input receptacle 22, a cassette tape player 24, an I-Pod 26 plugged into an I-Pod dock 28, or a memory stick 30 plugged into a USB port 32. The various signal sources may be installed when the vehicle 10 is being manufactured, installed by a vehicle dealer prior to delivery to a customer, or may be added by a vehicle owner after the vehicle is purchased. The various signal sources may be grounded at a variety of ground points on the vehicle, or be ungrounded if the signal source is battery powered, or may receive power from a power supply that may either isolate the signal common connection from the power ground point or provide a low resistance connection to the power ground point. It should be appreciated that it is advantageous for the vehicle entertainment system 14 to be able to adapt to receiving signals from a variety of signal sources having unknown grounding schemes and ground noise levels.

Figure 2:
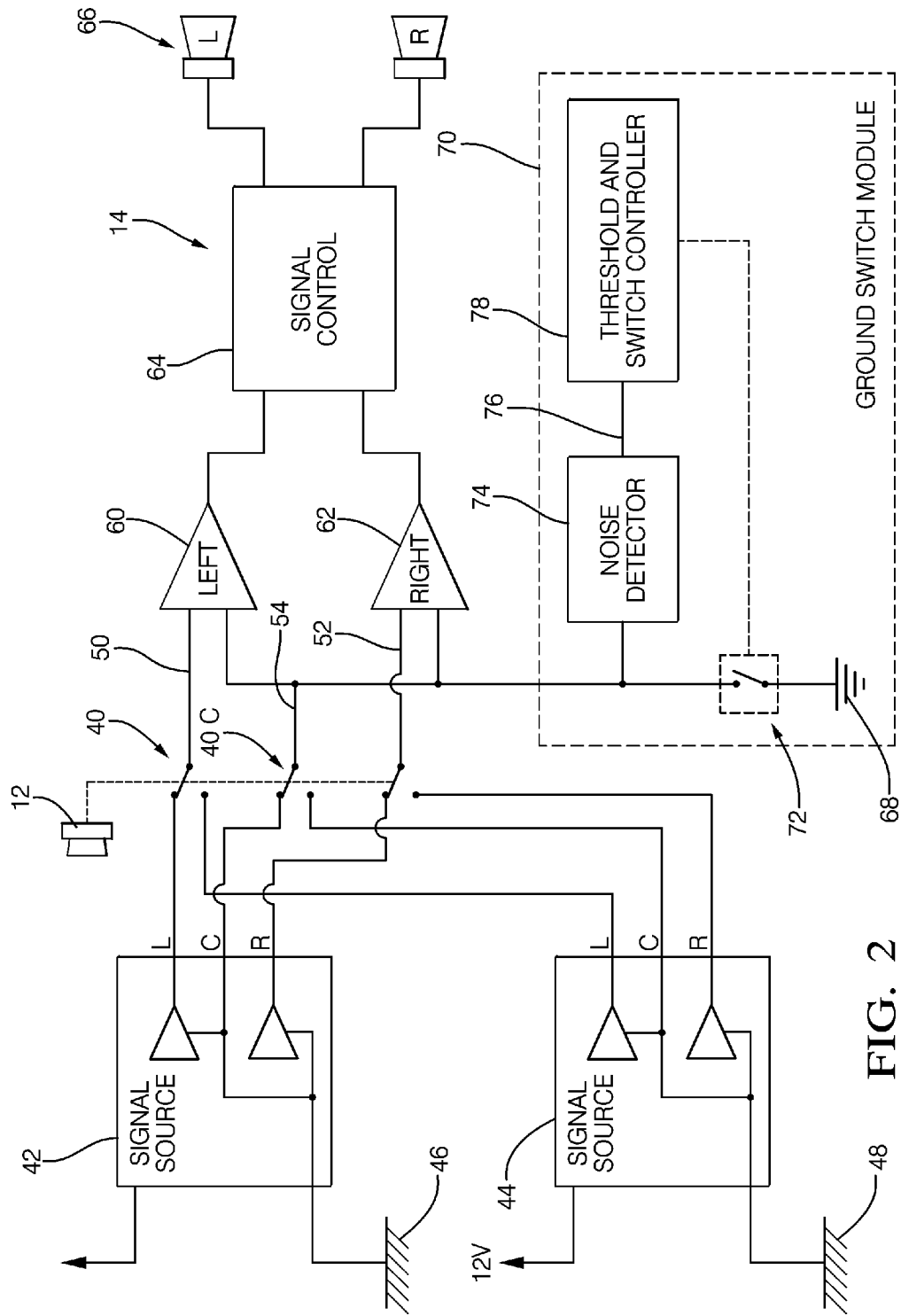
FIG. 2 is block diagram of one embodiment of a vehicle entertainment system in FIG. 1.

FIG. 2 illustrates an exemplary block diagram of the vehicle entertainment system 14. The input selector switch 12 is illustrated as being coupled to a switch bank 40. In this embodiment, the input selector switch 12 is illustrated as push button type switch connected to a bank switches operable to select either a signal source 42 or a signal source 44 to provide a signal to the vehicle entertainment system 14. Alternately, input selector switch 12 may be a rotary switch or an electronic switch coupled to a switch bank that is configured to select from two or more signal sources.

Each signal source may be coupled to a power ground for powering the signal source or for charging batteries within the signal source. The signal sources 42 and 44 are illustrated as coupled to distinct power grounds 46 and 48, respectively. The connection point on the vehicle 10 for each power ground 46 and 48 may be at distinct locations and by way of distinctly routed wires, so the noise present on each power ground 46 and 48 may also be distinct. Furthermore, the signal sources 42 and 44 may require a supply voltage other than the 12V shown, and so may include a linear or switching power converter. Alternately, the signal source 42 and/or 44 may be powered by internal batteries, and so would not be connected to either the power ground 46 or 48, or be connected to 12V. The signal sources 42 and 44 each have a common return C that may be directly coupled through the respective signal source to the respective power grounds 46 and 48, or may be electrically isolated from the respective power grounds. It follows that each common return C of each signal source may have differing amounts of noise dependent on noise present on the power ground, differing amounts of noise coupled into the signal path from each signal source to the input, and differing degrees of coupling through each signal source from the respective common return C to the respective power ground. Sources of varying electric fields such as a motor or a nearby radio frequency transmitter may also radiate electric fields that introduce noise into a signal source that may be conveyed to vehicle entertainment system 14.

Vehicle entertainment system 14 has an input that receives signals from the selected signal source via switch bank 40. The input has a left channel connection 50, a right channel connection 52, and a common connection 54. Switch bank 40 selectively couples a signal source to the input such that a corresponding left channel output L is coupled to the left channel connection 50, a right channel output R is coupled to the right channel connection 52, and a common return C is coupled to the common connection 54. Alternately, the vehicle entertainment system 14 may couple all of the common returns of all the signal sources to the common connection 54 and thereby eliminate the need for common switch 40C. It should be appreciated that the vehicle entertainment system 14 is not limited to stereo signals having distinct left and right channel signals and so may also be adapted to receiving single channel monaural signals, or multi-channel surround sound type signals.

In one embodiment, left channel amplifier 60 and right channel amplifier 62 may be differential input amplifiers that receive the signal input into vehicle entertainment system 14. Having differential type inputs is advantageous to prevent certain types of noise from contaminating the signals output by signal sources. For example, while not subscribing to any particular theory, if common output channel C of signal source 42 is strongly coupled or directly connected to power ground 46, and power ground 46 has a noise signal present, then the noise signal may also be present on common output channel C and, at least in part, may be duplicated on left channel output L and right channel output R of signal source 42. Signal noise that is similarly present on both the signal output channel and the common output channel is typically called common mode noise. Differential input amplifiers are known to be well suited to reject such common mode noise. Signals output by left channel amplifier 60 and right channel amplifier 62 are received by a signal control section 64 that may include volume control, tone control, and power amplifiers capable of driving speakers 66. It should be appreciated that noise that propagates through the vehicle entertainment system 14 to the speakers 66 may originate from or be traced to the common signal grounding scheme used at the input switch bank 40.

Vehicle entertainment system 14 has a ground point 68 at a location on the vehicle. In contrast to the example given above and while not subscribing to any particular theory, if output channel C of signal source 42 is electrically isolated or weakly coupled to power ground 46 by signal source 42, then a noise present on power ground may not be duplicated on left channel connection L and right channel output R. In this case, the common output channel may be described as floating and may be susceptible to noise being coupled or injected into wiring between signal source 42 and the input to vehicle entertainment system 14. Such a signal source may have less susceptibility to noise if it is coupled to a ground reference such as a ground point 68.

Since the degree of coupling between a power ground and common output channel C of a signal source may be uncertain, it may be advantageous to be able to selectively couple the common input connection 54 to the ground point 68. In one embodiment, vehicle entertainment system 14 includes a ground switch module 70 that includes a switch 72 configured to alternately change a switch state between a coupled state that couples or connects the common input connection 54 to the ground point 68, and a decoupled state that decouples or isolates the common input connection 54 from the ground point 68. Switch 72 may be a solid state device such as a MOSFET, or may be an electro-mechanical relay. If the MOSFET is an N-channel type MOSFET, then one suitable arrangement would have the drain connected to the common input connection 54, the source connected to the ground point 68, and the gate connected to a threshold and switch controller which will be described in more detail below. By this arrangement the switch 72 is in the coupled state when the MOSFET is on, and the switch 72 is in the decoupled state when the MOSFET is off.

In another embodiment, the ground switch module 70 may include one or more additional ground points in addition to ground point 68. For example one ground point could be a chassis ground point that is close to the entertainment system, and another ground point may be a ground lug on the engine, or a ground point used by the ECM. It will be appreciated by that the additional ground points may be selected base on empirical data and/or previous experience. As such, switch 72 would be configured to make connections to more than the single ground point 68 as illustrated.

Ground switch module 70 may also include a noise detector 74 configured to determine a noise signal value of noise at the common connection 54 and output on a noise value to connection 76. The noise detector 74 may be configured to detect a peak voltage based value relative to some reference potential, or may determine a root-mean-square (RMS) voltage based value. Noise detector 74 may also include a filter adapted to reject or remove infrasonic and/or ultrasonic noise from being included in the determination of a noise signal value. Noise detector 74 may suitably be formed of operational amplifiers and passive components such as resistors and capacitors.

Ground switch module 70 may also include a threshold and a switch controller 78. Controller 78 may include a microprocessor or other control circuitry as should be evident to those in the art. Controller 78 may include memory, including non-volatile memory, such as electrically erasable programmable read-only memory (EEPROM) for storing one or more routines, thresholds and captured data. The one or more routines may be executed by the microprocessor to perform steps for operating the switch 72 as described herein. Controller 78 may determine a threshold for comparing to the noise signal value from noise detector 74. It should be appreciated that while the noise detector 74 and the controller 78 are shown as separate blocks for the purposes of explanation, the noise detector 74 and the controller 78 may be integrated into a single device such a digital signal processor device. Controller 78 may also be configured to determine that the noise signal value is greater than the threshold and output a switch control signal to change or toggle the switch state of switch 72. The initial state of switch 72 engaged each time the input selector switch 12 is operated to select a certain signal source may be based on the switch state used the last time the signal source in question was selected. Ground switch module 70 may also be adapted to receive a noise signal value from noise detector 74 and have programming adapted to determine a threshold and make the comparison of the threshold to the noise signal value to determine if the switch state of switch 72 should be changed. Controller 78 may also include an output adapted to generate a signal to operate switch 72.

In another embodiment, the threshold and switch controller 78 may be further configured to determine a noise signal value after the switch state is changed. If the noise signal value increases following the change of switch state, the threshold may be increased and the switch module affects another change of switch state. Increasing the threshold when changing the switch state does not decrease the noise signal value is advantageous because the controller 78 can then adapt to varying noise conditions. This adaptive threshold is particularly useful for vehicle entertainment systems that include an auxiliary input receptacle coupled to the input of the vehicle entertainment system by the input selector switch 12 since the operator may unplug one signal source device and plug in another signal source device having a different noise level value without operating the input selector switch 12.

Figure 3:
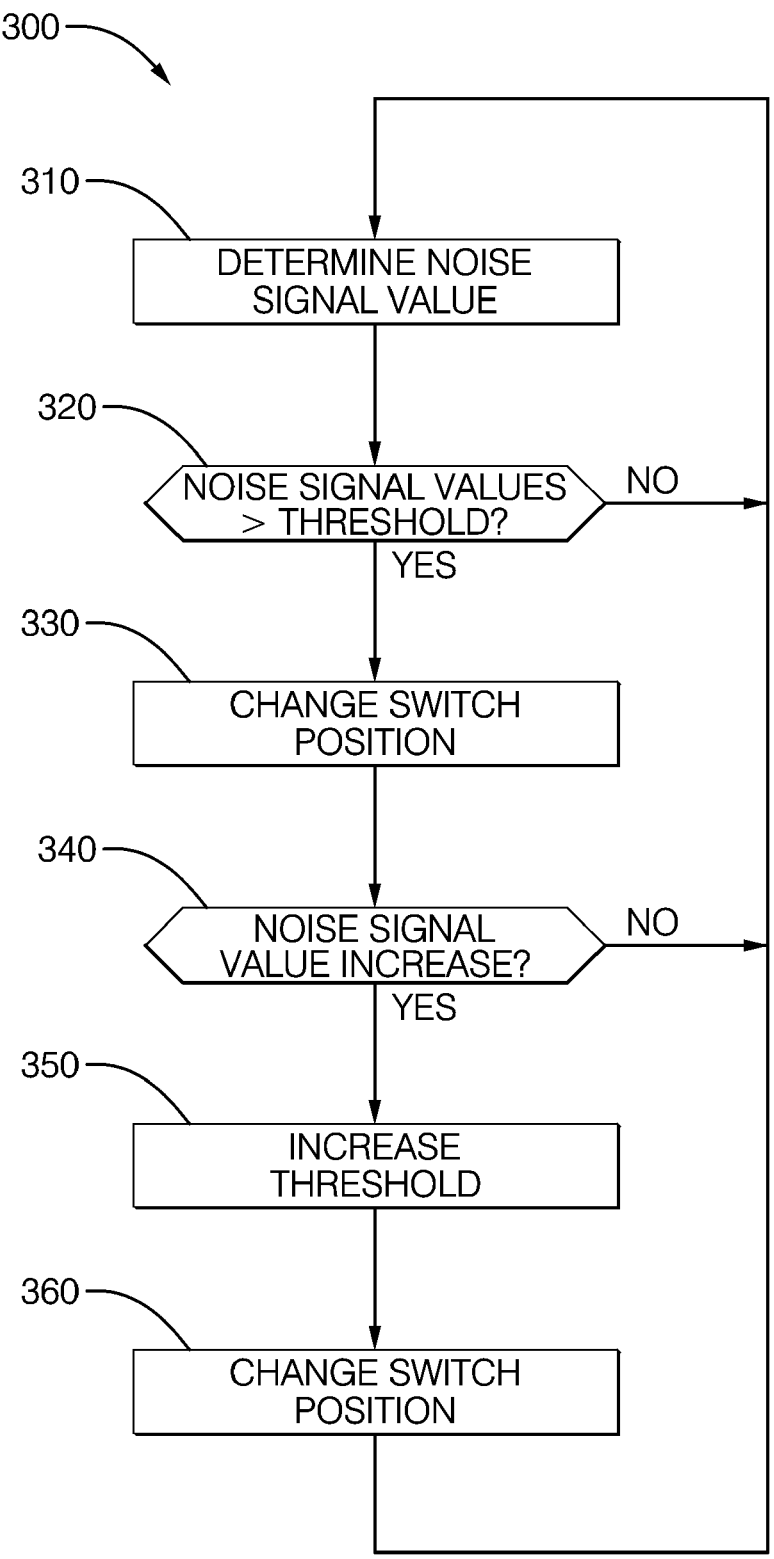
FIG. 3 is a flowchart of a method of reducing ground noise used by the system in FIG. 2.

FIG. 3 illustrates a flowchart 300 of an exemplary method for operating a vehicle entertainment system 14. At step 310, noise detector 74 determines a noise signal value. At step 320, if the controller 78 determines that the noise signal value is less than the threshold, then the controller 78 continues to monitor the noise signal value as illustrated by the NO logic path returning to step 310. If the noise signal value is determined to be greater than a threshold, then the YES path is taken from step 320. At step 330, the controller 78 outputs a signal effective to change the state of switch 72. At step 340, if following changing the state of switch 72 controller 78 determines that the noise signal value has decreased, then the controller 78 continues to monitor the noise signal value as illustrated by the NO logic path returning to step 310. Alternately, the controller 78 may also decrease the threshold value as part of an adaptive algorithm to adjust a default threshold value. If following changing the state of switch 72 controller 78 determines that the noise signal value has increased, controller 78 increases the threshold. The amount that the threshold is increased by controller 78 may be determined based on the noise signal value present during the previous switch state, or may be increased by a predetermined incremental value. At step 360, controller 78 changes the switch back to the previous state. As such the controller 78 may continue to incrementally increase the threshold and toggle the switch 72 between the coupled state and the decoupled state until a threshold is found that is greater than the present noise signal level and does not lead to changing the switch state.

Figure 4:
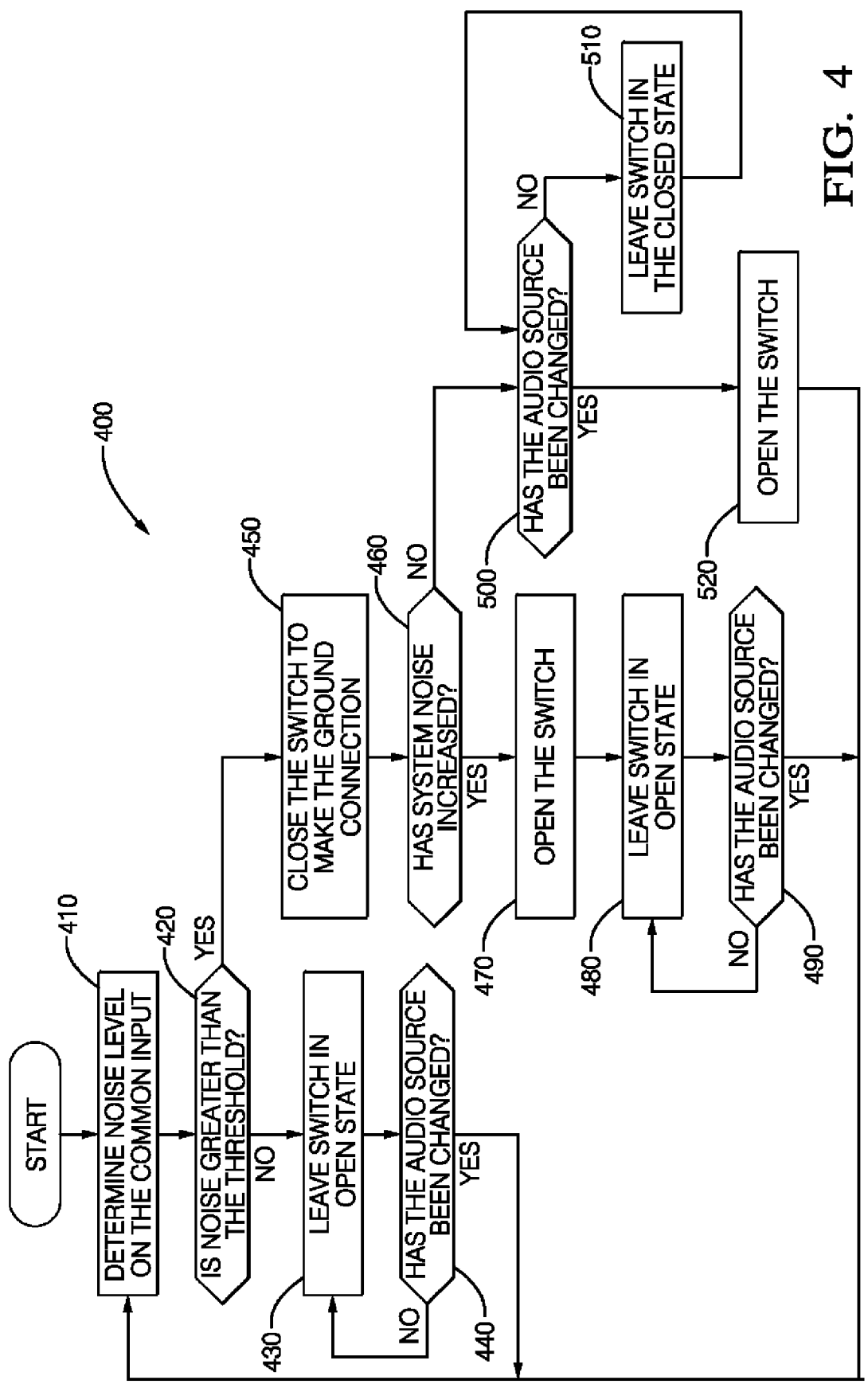
FIG. 4 is a flowchart of a method of reducing ground noise used by the system in FIG. 2.

FIG. 4 illustrates a flowchart 400 of another exemplary method for operating a vehicle entertainment system 14. The flowchart may be initiated at START when the signal source selected by the vehicle entertainment system 14 is changed. At step 410, the noise detector 74 determines a noise signal value on the common input line. At step 420, if the controller 78 determines that the noise signal value is less than the threshold, then the logical NO path is followed. At step 430, controller 78 sends a signal to switch 72 to remain in the open state. As part of an adaptive algorithm, the controller 78 may decrease the threshold to a new default state. At step 430, the controller 78 sends a signal to ensure that switch 72 remains in the open state. At step 440, the vehicle entertainment system 14 determines if a new signal source is selected. If a new source is not selected, the logical path NO is followed and the system returns to step 430. If at step 440 a new source is selected, then the logical path YES is selected and the system returns to step 410. If at step 420 the noise signal value is greater than the threshold, then the logical YES path is followed. At step 450, the controller 78 sends a signal to switch 72 to close the switch and thereby make contact with the ground point 68. At step 460, it is determined if the system noise level has increased. If the system noise level has increased, then the logical YES path is followed. At step 470, the controller 78 sends a signal to open switch 72. At step 480, controller 78 maintains the signal to ensure that switch 72 remains open. As part of an adaptive algorithm, if following changing the state of switch 72 controller 78 determines that the noise signal value has increased, controller 78 may increases the threshold. The amount that the threshold is increased by controller 78 may be determined based on the noise signal value present during the previous switch state, or may be increased by a predetermined incremental value. Controller 78 may continue to incrementally increase the threshold and toggle the switch 72 between the coupled state and the decoupled state until a threshold is found that is greater than the present noise signal level and does not lead to changing the switch state. At step 490, the vehicle entertainment system 14 may determine that a new audio source has been selected. If a new audio source has not been selected, then the logical path NO is followed and the system returns to step 480. If a new audio source has been selected, then the system returns to step 410. If at step 460 the system noise does not increase, then the logical NO path is followed and switch 72 is left in the closed state. At step 500, the vehicle entertainment system 14 determines if a new audio source is selected. If a new audio source has not been selected, then the logical path NO is selected. At step 510, the controller 78 continues to send a signal to switch 72 to remain closed and the system returns to step 500. If at step 500 the radio's microprocessor determines that a new audio source has been selected, then the logical YES path is followed. At step 520, the controller 78 sends a signal to open switch 72 and the system returns to step 410.

It should be appreciated that it may be desirable to perform the steps of flowchart 300 or 400 quickly so as to avoid a listener hearing noise for an objectionable period of time. As such, in one embodiment, the steps of determining a noise signal value on the common connection, comparing the noise signal value to a threshold, and changing the switch state if the noise signal exceeds a threshold may be performed in less than 50 milliseconds. Furthermore, it may be desirable to mute or turn off the signals to the speakers 66 when the controller 78 determines that the noise signal value is greater than the threshold so that the listener does not hear the noise. This feature may be provided by a signal connection (not shown) between the controller 78 and the signal control 64.

Accordingly, a vehicle entertainment system 14 and method 300 for operating a ground mode switch module 70 in the vehicle entertainment system 14 are provided. The ground mode switch module 70 is adapted to determine if ground noise is present from a selected signal source and changes the common signal grounding connection for the selected signal source so as to minimize the amount of noise propagating through the entertainment system and output by speakers 66. As such, the vehicle entertainment system 14 can automatically adapt to various signal sources having various grounding connections. Some customers of vehicle entertainment systems require that one or the other grounding method be used. For this case, the ground mode switch module may be fixedly set to either the coupled state or the decoupled state in accordance with the customer requirements. By this arrangement, the manufacturer of the vehicle entertainment system 14 does not need to manufacturer two different vehicle entertainment systems to satisfy the requirements of two different customers requiring two different grounding methods. As such, the manufacturer of the vehicle entertainment system 14 reduces costs by reducing the proliferation of various vehicle entertainment systems.

While this invention has been described in terms of the preferred embodiments thereof, it is not intended to be so limited, but rather only to the extent set forth in the claims that follow.

We claim:

1. A vehicle entertainment system having ground noise reduction comprising:
    an input comprising a left channel connection, a right channel connection, and a common connection characterized as a reference for the left channel connection and the right channel connection;
    a signal source comprising a left channel output coupled to the left channel connection, a right channel output coupled to the right channel connection, and a common return coupled to the common connection, wherein said common return is characterized as a reference for the left channel output and the right channel output;
    a ground point at a location on the vehicle;
    a noise detector configured to determine a noise signal value of a noise signal at the common connection; and
    a ground switch module comprising a switch configured to alternately change a switch state between a coupled state that couples the common connection to the ground point, and a decoupled state that decouples the common connection from the ground point, wherein if the noise signal value is above a threshold, the ground switch module changes the switch state.

2. The system in accordance with claim 1, wherein if the noise signal value increases following the change of switch state, the threshold is increased and the switch module changes the switch state.

3. The system in accordance with claim 1, further comprising an auxiliary input receptacle selectively coupled to the input by an input selector switch.

4. The system in accordance with claim 1, wherein the switch comprises a semiconductor device arranged to switch between the coupled state and decoupled state.

5. The system in accordance with claim 4, wherein the switch comprises a MOSFET arranged such that the switch is in the coupled state when the MOSFET is on, and the switch is in the decoupled state when the MOSFET is off.

6. A method of controlling a ground mode switch module in a vehicle entertainment system comprising a common connection,
    an input comprising a left channel connection, a right channel connection, and a common connection characterized as a reference for the left channel connection and the right channel connection;
    a signal source comprising a left channel output coupled to the left channel connection, a right channel output coupled to the right channel connection, and a common return coupled to the common connection, wherein said common return is characterized as a reference for the left channel output and the right channel output;
    a ground point at a location on the vehicle, a noise detector configured to determine a noise signal value, and a ground switch module configured to alternately change a switch state between a coupled state and a decoupled state, said method comprising: determining a noise signal value on the common connection; comparing the noise signal value to a threshold; and changing the switch state if the noise signal exceeds a threshold.

7. The method in accordance with claim 6, further comprising the step of increasing threshold followed by changing the switch state when the noise signal value increases following the changing the switch state.

8. The method in accordance with claim 6, further comprising the step of decreasing threshold when the noise signal value decreases following the changing the switch state.

9. The method in accordance with claim 6, wherein the steps of determining a noise signal value on the common connection, comparing the noise signal value to a threshold, and changing the switch state if the noise signal exceeds a threshold are performed in less than 50 milliseconds.

* * * * *